United States Patent

Nabkel

[19]

[11] Patent Number: 5,963,626
[45] Date of Patent: *Oct. 5, 1999

[54] METHOD AND SYSTEM FOR POSTING MESSAGES TO CALLERS BASED ON CALLER IDENTITY

[75] Inventor: Jafar S. Nabkel, Boulder, Colo.

[73] Assignees: US West, Inc., Denver; MediaOne Group, Inc., Englewood, both of Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/937,577

[22] Filed: Sep. 25, 1997

[51] Int. Cl.⁶ .............................. H04M 1/56; H04M 15/06
[52] U.S. Cl. ................... 379/142; 379/88.2; 379/88.23; 379/243
[58] Field of Search ................. 379/67.1, 88.01, 379/88.02, 88.04, 127, 142, 76, 68, 80, 84, 88.09, 88.11, 88.12, 88.2, 88.21, 88.23, 88.25, 130, 243, 245

[56] References Cited

U.S. PATENT DOCUMENTS

| | | | |
|---|---|---|---|
| 5,276,731 | 1/1994 | Arbel et al. | 379/142 |
| 5,278,894 | 1/1994 | Shaw | 379/142 |
| 5,394,445 | 2/1995 | Ball et al. | 379/142 |
| 5,592,537 | 1/1997 | Moen | 379/112 |
| 5,651,053 | 7/1997 | Mitchell | 379/142 |
| 5,651,055 | 7/1997 | Argade | 379/142 |
| 5,724,412 | 3/1998 | Srinivasan | 379/142 |

Primary Examiner—Curtis A. Kuntz
Assistant Examiner—Binh K. Tieu
Attorney, Agent, or Firm—Brooks & Kushman

[57] ABSTRACT

A method and system for generating and posting a message to callers based on a caller's identity includes a communication station for determining whether a calling party is attempting to connect with the subscriber. An adjunct processor determines an identity of the calling party based on the calling party's calling number and optional personal identification number (PIN). An intelligent peripheral unit generates a voice or textual message for receipt by the calling party based on the identity of the calling party according to instructions provided by the adjunct processor. Each message may be received by one or more callers, i.e. individuals or groups.

8 Claims, 6 Drawing Sheets

METHOD AND SYSTEM FOR POSTING MESSAGES TO CALLERS BASED ON CALLER IDENTITY

CROSS-REFERENCE TO RELATED APPLICATIONS

This application relates to co-pending applications entitled "Method And System For Generating Predetermined Messages During Selected Calls-In-Progress", having Ser. No. 08/937,578, and "Method And System For Processing Incoming Calls During Calls-In-Progress," having Ser. No. 08/937,576, both of which are assigned to the assignee and have the same filing dates as the present application.

TECHNICAL FIELD

This invention relates to methods and systems for posting messages to callers based on the caller's identity.

BACKGROUND ART

It is sometimes desirable to easily and practically deliver a message to one or more parties that is easily accessible by each of the parties. For example, a group leader may want to leave a message for every member of his/her group without having to contact each member individually. Similarly, an individual may want to leave a message for a relative or friend that they cannot reach via the telephone because they are out running errands.

It is possible for the individual to leave such a message on their message machine at home as part of their greeting. However, this is not desirable since such messages are intended to be private for specific calling parties.

Voice messaging systems, on the other hand, allow a subscriber to prerecord a message to be delivered or "broadcast" to one or more specific individuals at a predetermine time. Such a system, however, requires all recipients to also have voice messaging capability which may not be the case.

DISCLOSURE OF THE INVENTION

It is thus a general object of the present invention to provide a method and system for generating messages associated with a subscriber for receipt by predetermined callers based on their identity.

In carrying out the above object and other objects, features, and advantages of the present invention, a method is provided for generating messages associated with a subscriber. The method includes the step of determining whether a calling party is attempting to connect with the subscriber. If so, the method proceeds to determine an identity of the calling party. Finally, the method includes the step of generating the message for receipt by the calling party based on the identity of the calling party.

In further carrying out the above object and other objects, features, and advantages of the present invention, a system is also provided for carrying out the steps of the above described method. The system includes a communication station for determining whether a calling party is attempting to connect with the subscriber. The system also includes an adjunct processor for processing information identifying the calling party. Finally, the system includes an intelligent peripheral unit for generating the prerecorded message for receipt by the calling party based on the identity of the calling party The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
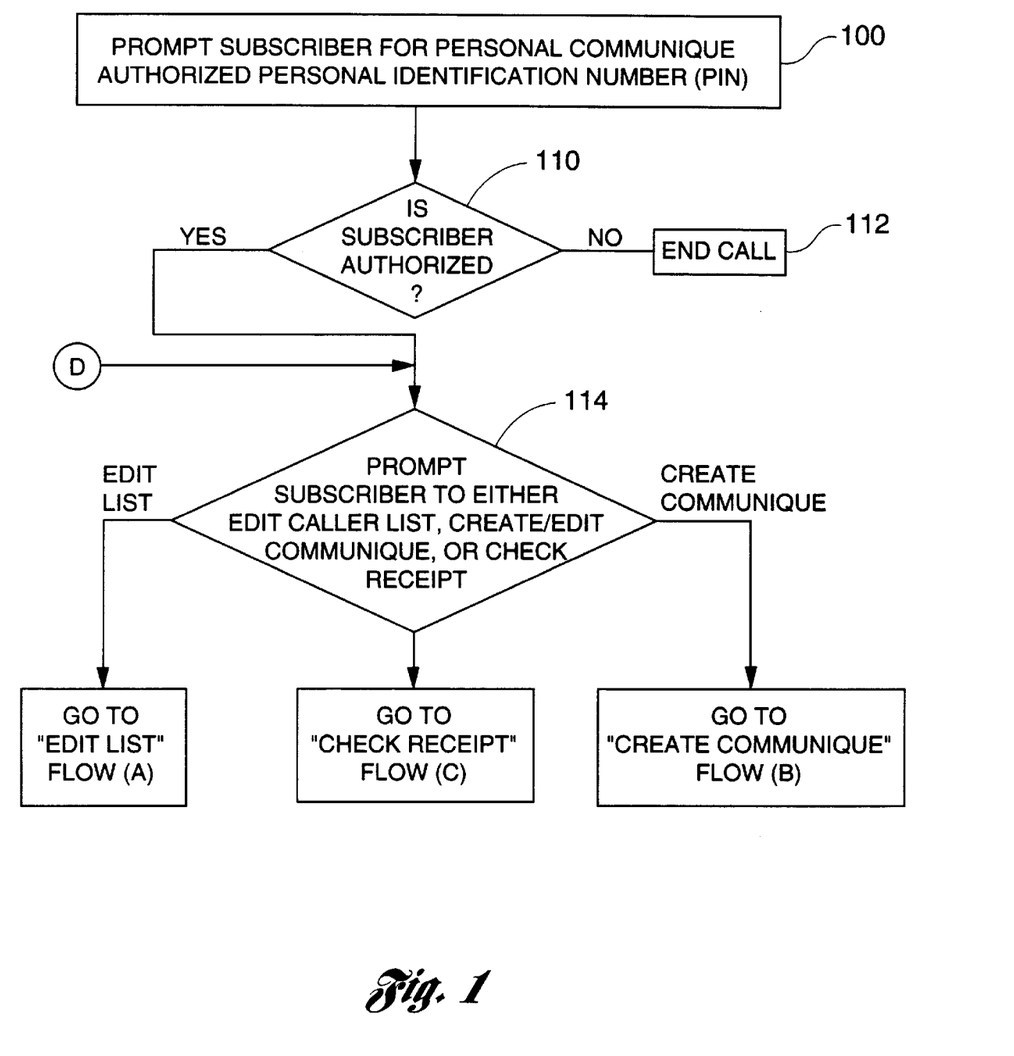
FIG. 1 is a flow diagram illustrating the general sequence of steps associated with configuring the personal communique feature of the present invention.

Turning now to FIG. 1, there is shown a flow diagram illustrating the general sequence of steps associated with configuring the personal communique feature of the present invention. Upon gaining access to the service provider, the subscriber is prompted for his/her Personal Identification Number (PIN), as shown at block 100. If the subscriber enters an invalid PIN, the call is ended, as shown at conditional block 110 and block 112.

Figure 2:
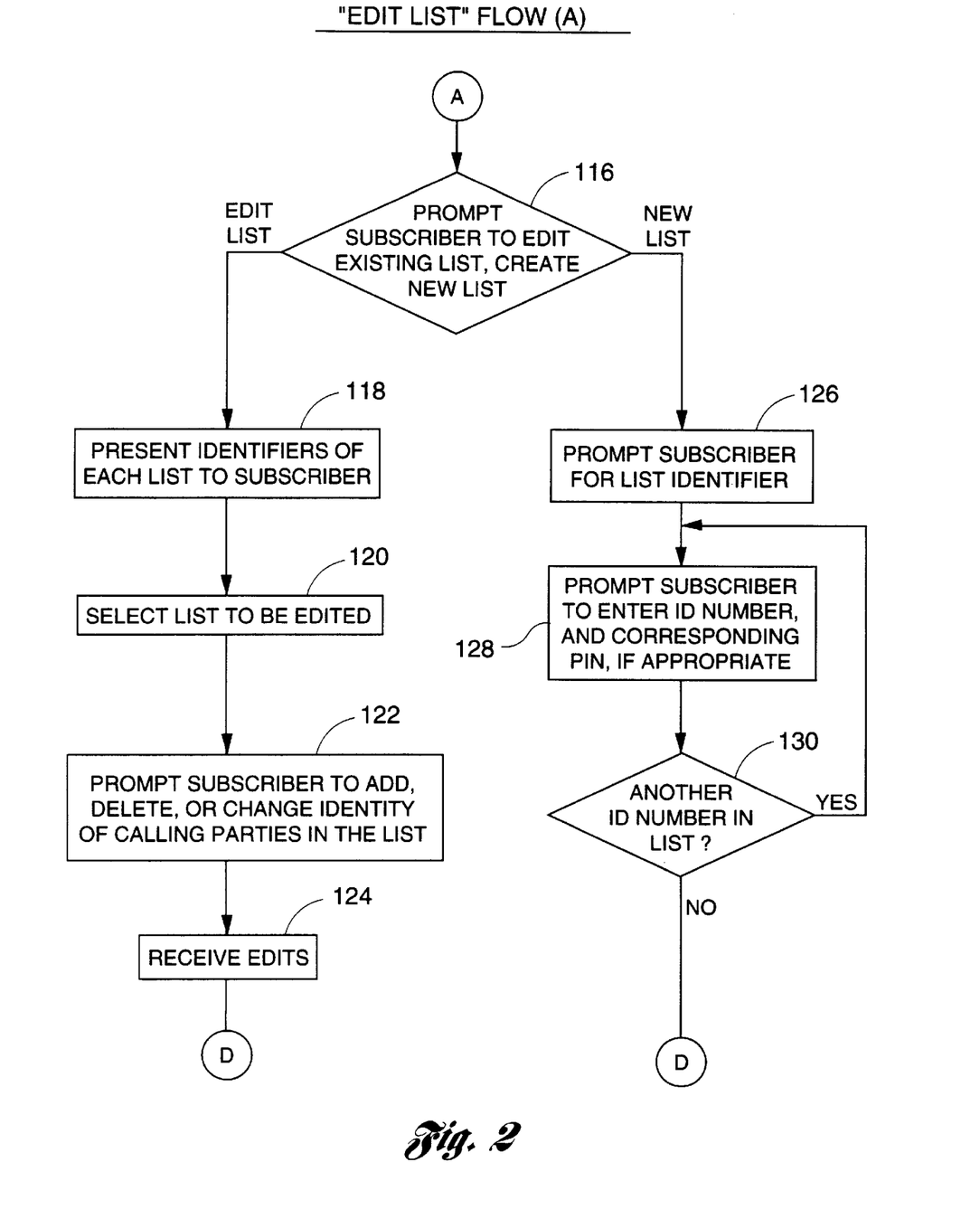
FIG. 2 is a flow diagram illustrating the general sequence of steps associated with editing a caller list.

Upon entering a valid PIN, the subscriber is then prompted to determine whether he or she wishes to edit a caller list, create/edit a communique, or check receipt of his communique, as shown at conditional block 114. Assuming the subscriber chooses to edit his caller list, the method proceeds to the "Edit List" operation as illustrated in FIG. 2. First, the subscriber is prompted to either edit an existing list or create a new list, as shown at conditional block 116.

If the subscriber chooses to edit an existing list, the method proceeds to present list identifiers of each caller list to the subscriber, as shown at block 118, so as to enable the subscriber to select the list he/she wishes to edit, block 120. The subscriber is then prompted to edit the list by adding, deleting or changing the identity of calling parties in the list, block 122. The edits are received by the service provider, block 124, and the method returns to the main program (FIG. 1).

Returning to conditional block 116, if the subscriber chooses to create a new caller list, the subscriber is then prompted to enter a list identifier, as shown at block 126. The list identifier is a brief name of the list identifying the group of calling parties authorized to receive a certain prerecorded message, such as, for example, "family", "baseball team", etc.

Next, the subscriber is prompted to enter the identification (ID) number of the calling party belonging to the new list, as shown at block 128. The ID number represents the identity of the calling party, such as, for example, an Internet address or a telephone number including area code. If desired, the subscriber may enter a corresponding PIN number associated with the ID number for very private communiques or for situations in which the calling party has his/her phone number—blocked from caller ID or is calling from a telephone having an ID number different than the authorized ID number. If the subscriber has additional ID numbers he/she wishes to add to the list, this step is repeated, as shown at conditional block 130. Otherwise, the method returns to the main program (FIG. 1).

Thus, one or more authorized calling parties can hear a prerecorded message by the subscriber. In the case of group leaders (e.g., of little league, softball, social clubs, committees, religious organizations, etc.) this creates a centralized and automated way to inform multiple people who want or need to receive updated information. Group leaders no longer have to place dozens of calls, many of them more than once, to "get the message out."

Figure 3:
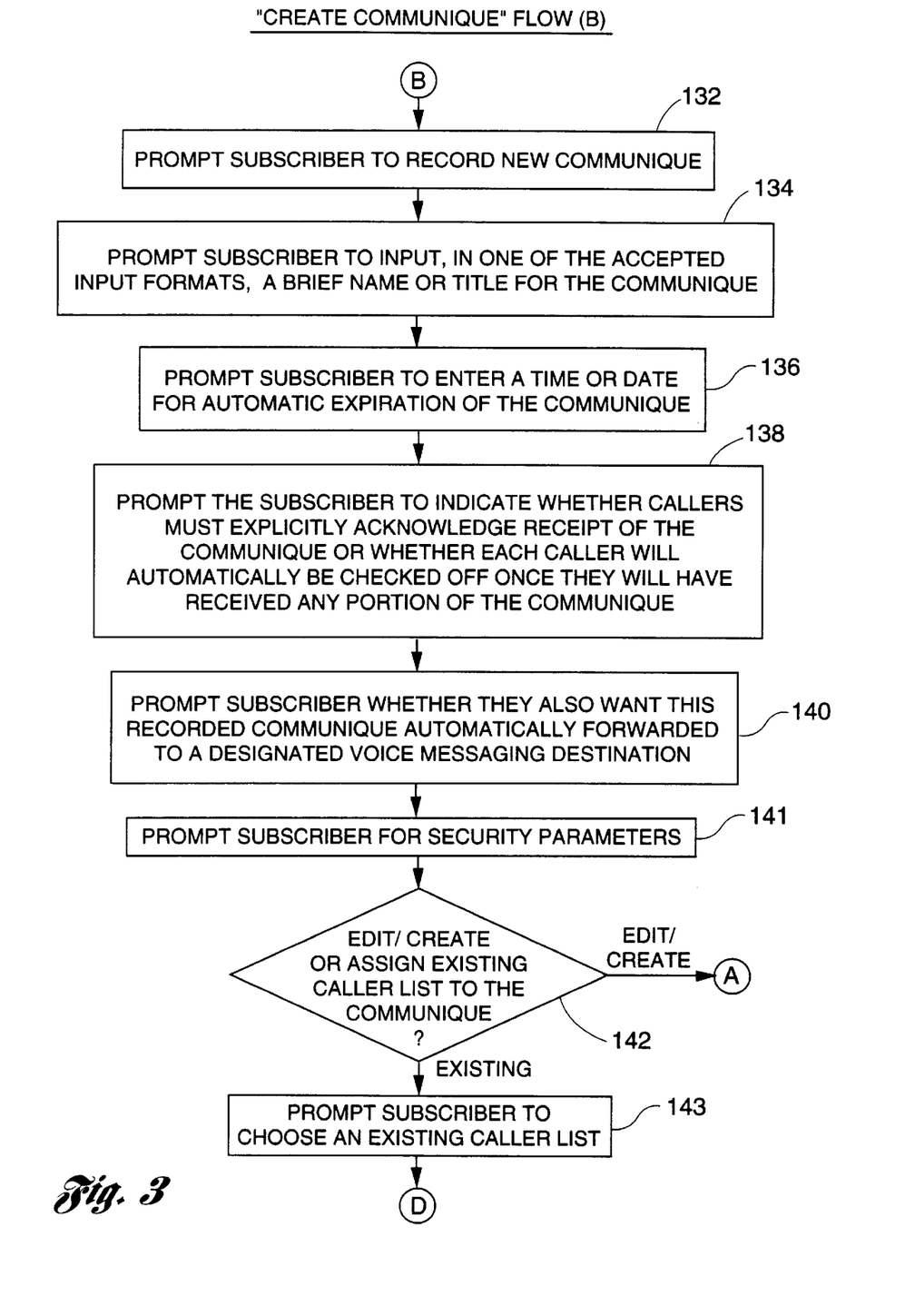
FIG. 3 is a flow diagram illustrating the general sequence of steps associated with creating a personal communique.

Returning to conditional block 114 of FIG. 1, if the subscriber chooses to create a communique, the method proceeds to the "Create Communique" flow diagram illustrated in FIG. 3. The subscriber is prompted to record his new communique, as shown at block 132. For example, a parent may record a message for his/her child such as, "Hi, Julieann honey. It's 3:15. I just left home. I'll be there at school to pick you up by 3:30. Please wait by the main doors." Or, a little league coach may want to let everyone on the team know that "tonight's game has been canceled," or "the 6:15 game Thursday has been moved to the North field." The input from the subscriber may be accomplished one of many ways such as, for example, speaking the communique, typing or indicating some form of textual message for either text-to-speech conversion or text-based retrieval, or selecting a prerecorded message.

The subscriber is then prompted to enter a brief name or title of the communique, block 134, and, if appropriate, a time or date for automatic expiration of the communique, block 136. For example, a social group leader might establish a new communique every week and set that message to expire in seven days. Alternatively, a communique may not expire until everyone on the list hears the message. Next, the subscriber is prompted to identify how the communique will be considered received or acknowledged by each calling party, as shown at block 138. The subscriber may choose to have the calling parties explicitly acknowledge receipt of the communique or have the calling parties automatically checked off once they have received any portion of the communique.

The subscriber may have the option of having the new communique automatically forwarded to a designated voice messaging destination, as shown at block 140. For example, a subscriber may leave a message such as "Hi, Pat, I'm going to be about 20 minutes late today. It's 3:15 and I'm leaving now to pick up Julieann at school. After I drop her off at her music lesson, I'll meet you at the trailhead parking lot. It will probably be about 4:20. I am leaving this message on your voice mail and also here at home to reach you one way or another. See you in an hour!"

The subscriber may also have the option of specifying security parameters for the communique, as shown at block 141. For example, the subscriber may assign a message Personal Identification Number (PIN) associated with the message or a personal PIN associated with a specific individual.

Finally, the subscriber is prompted to either edit/create or assign an existing caller list to the communique, as shown at conditional block 142. If a caller list exists already, the subscriber assigns the communique to one or more caller lists and returns to the main program (FIG. 1) where he/she may create another communique. If the subscriber needs to edit/create a new caller list, the method proceeds to either the "Edit List" program illustrated in FIG. 2, after which the subscriber may again create a new communique.

Figure 4:
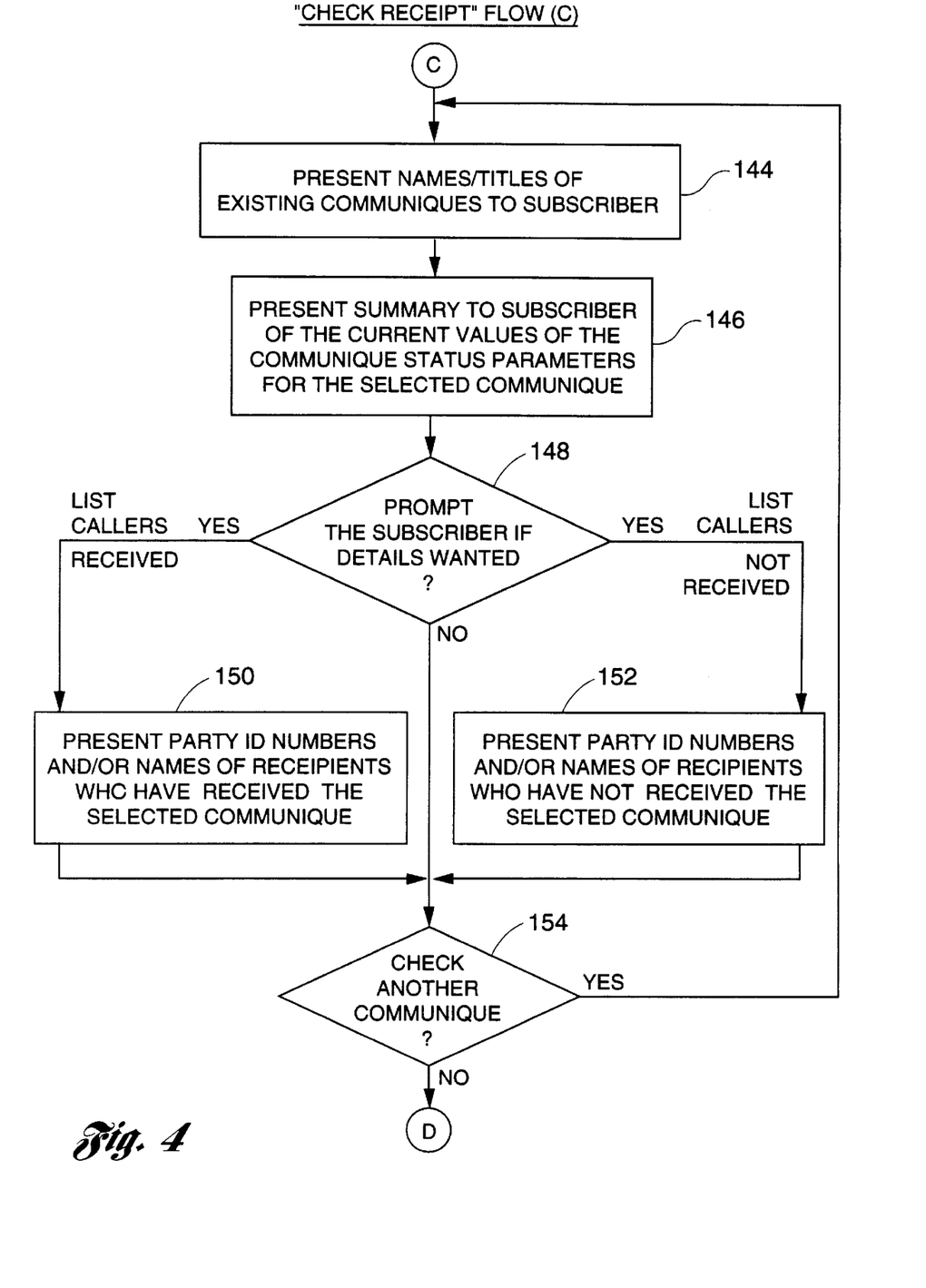
FIG. 4 is a flow diagram illustrating the general sequence of steps associated with checking receipt of a personal communique.

The flow diagram illustrating the "Check Receipt" portion of the present invention is illustrated in FIG. 4. When the subscriber has selected this option, he is presented with the names/titles of the communiques he has recorded, as shown at block 144. Upon selecting one of the communiques, the subscriber is then presented with a summary of the current values for the selected communique, block 146. At this time the subscriber is given the number of recipients who have received the communique and the number who have not.

At conditional block 148, the subscriber may choose to obtain additional details regarding the status of the communique. The subscriber may select to have the ID numbers and/or names of the calling parties who have received the selected communique, as shown at block 150. Alternatively, the subscriber may select to have the ID numbers and/or names of the calling parties who have not received the selected communique, as shown at block 152. The subscriber may then check the status of additional communiques, as shown at conditional block 154.

Figure 5:
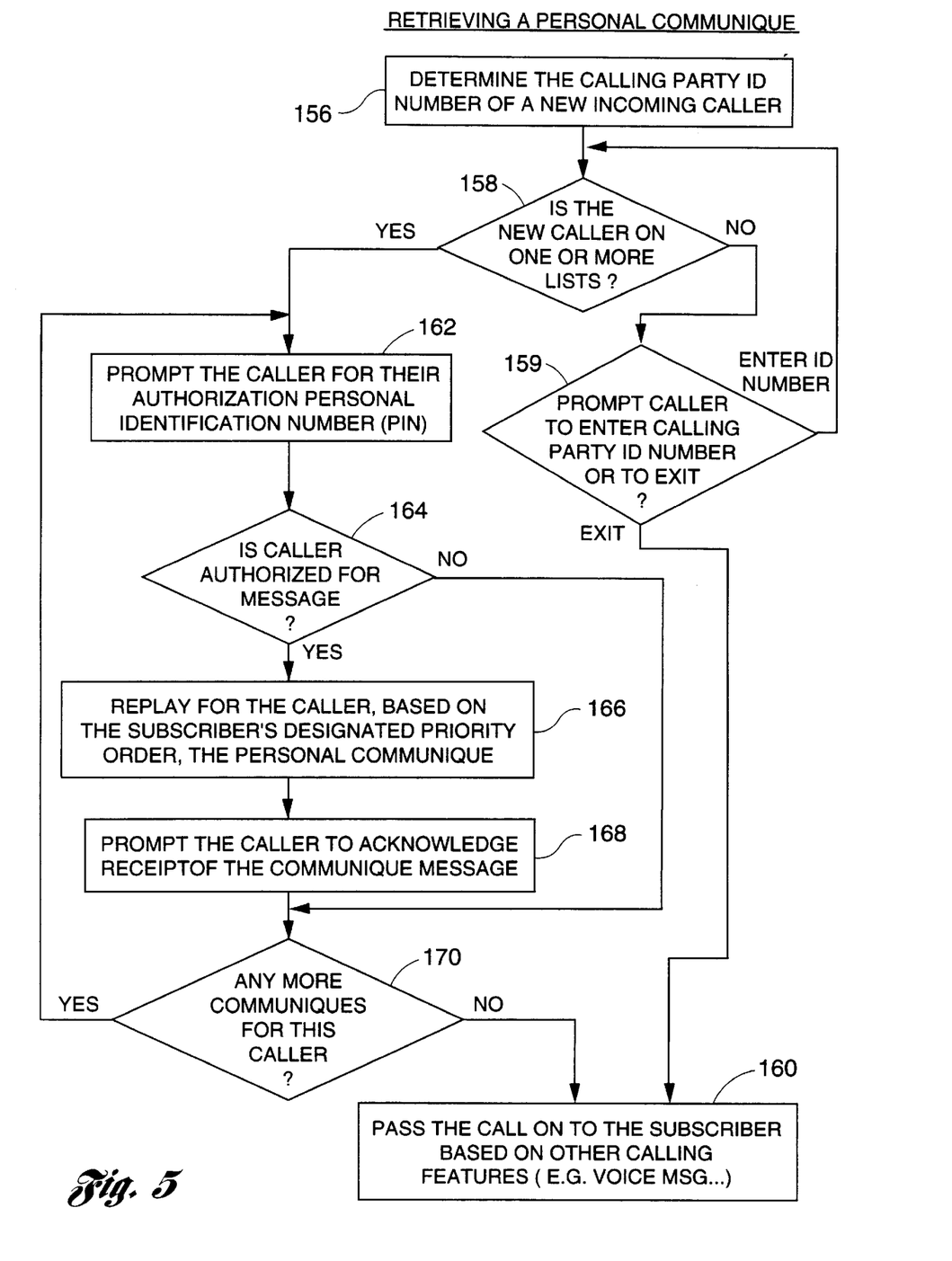
FIG. 5 is a flow diagram illustrating the general sequence of steps associated with retrieving a personal communique.

Turning now to FIG. 5, there is shown a flow diagram illustrating the general sequence of steps associated with a calling party retrieving a personal communique recorded for their receipt. Upon detecting an incoming call to the subscriber, the service provider determines the ID number of the calling party, as shown at block 156. This may be determined through ANI.

The ID number is then compared with the ID numbers in each of the subscriber's lists, conditional block 158, to determine if the calling party is on one of the subscriber's lists. If not, the calling party is prompted to enter his/her calling party ID number or to exit, as shown at conditional block 159. This step is performed in case the new caller is not calling from his/her authorized telephony device.

If the caller wishes to exit, he/she is transferred to the subscriber according to other features, e.g., voice messaging, as shown at block 160. If the caller enters an ID number, the ID number is compared with the ID numbers stored in each of the subscriber's list, as shown at conditional block 158.

If the calling party is on one of the lists, the calling party is prompted to enter their PIN, if required, as shown at block 162. A determination is then made as to whether or not the calling party is authorized to receive a personal communique, conditional block 164. If so, the authorized personal communique is played/presented to the subscriber, as shown at block 166.

If the subscriber requires acknowledgement of the communique, the calling party is prompted to acknowledge receipt of the communique, as shown at block 168. If there are any more communiques authorized for this calling party, the process is repeated, as shown at conditional block 170. Otherwise, the calling party is transferred to the subscriber according to the subscriber's features, block 160.

The present invention may be implemented utilizing an intelligent network (IN) or an Advanced Intelligent Network (AIN). Alternatively, the present invention may be implemented on or adjunct to a communication station such as, for example, a public switch network end office switch, or a Customer Premise Equipment (CPE).

In the preferred embodiment, utilizing AIN, an IN superimposes on an existing telecommunications system a modular configuration of network elements which provide enhanced telecommunications services. Switching functions are performed by the base network in a conventional manner. The IN includes a communication station such as, for example, a service switching point (SSP), an adjunct processor such as, for example, a service control point (SCP). The IN may also include an intelligent processor (IP) which provides specialized functionality, such as speech recognition, voice announcement, and speech synthesis capability. The functionality of the IP may be implemented in a separate network element, or may be implemented through a multimedia SCP.

The SSP is a switch that operates to recognize service requests, process telephone calls, and request/receive call handling instructions to complete a telephone call. The SSP provides intelligent network "triggering"—detecting a condition which requires the SSP to initiate the IN service by sending a query to the SCP—used by the network to recognize requests. The SSP also formulates and transmits requests to the SCP and processes replies and requests from the SCP. The SSP creates and plays intelligent network announcements formulated by the service provider (e.g., the local exchange or interexchange carrier), and transmits event messages (such as busy or no reply signals) to the SCP.

The SCP is an IN element which stores call control and call routing instructions executed by an SSP. The SCP receives requests from the SSP and determines the destination telephone number. The SCP receives and processes event messages from the SSP, and formulates and sends responses to the SSP. The SCP processes accounting and statistical information, such as the number of the calling party, the dialed intelligent network number, duration or type of ringing tone or call waiting signal, and other such call parameters.

Figure 6:
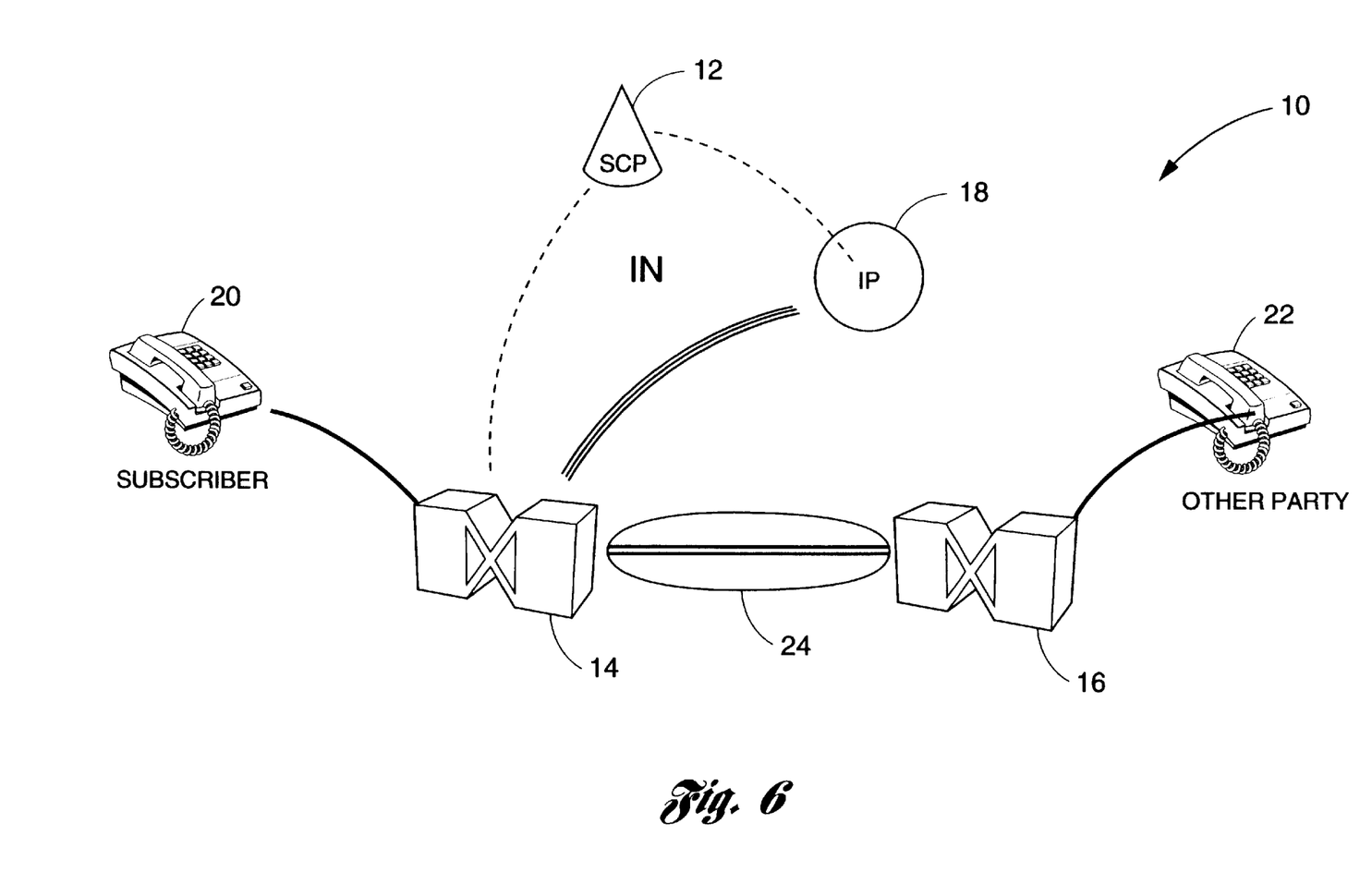
FIG. 6 is a simplified block diagram of a network system architecture suitable for use with the present invention.

An exemplary system architecture suitable for implementing the call attendant functionality in accordance with the present invention will now be described with reference to FIG. 6. The system, denoted generally by reference numeral 10, includes an adjunct processor 12 in communication with communication station 14 and/or communication station 16. Adjunct processor 12, such as an SCP, is provided in communication with communication stations 14 and 16 via Signaling System No. 7 (SS7) protocol or a similar messaging protocol and system. The system 10 further includes IP 18 in communication with adjunct processor 12 and communication station 14 and/or communication station 16.

As shown, communication station 14 is provided in communication with a subscriber 20, while communication station 16 is provided in communication with a second telephony device 22. Subscriber 20 may have a telephony device in communication with communication station 14, or may simply have a subscriber ID number at communication station 14, with no telephony device. Telephony devices 20 and 22 may be telephones, text-based telephones, computer telephones, or the like, and provided in communication with any similar communication station. Any or all of the telephony devices 20, 22 may be in communication with the same communication station or, alternatively, a different communication station via a communication network 24, as shown in FIG. 6. The communication network 24 may be either the Public Switched Telephone Network (PSTN), a data network such as, for example, the Internet, or any other similar communication network.

The operation of the present invention will now be described with reference to FIG. 6. To configure the personal communiques, the subscriber interfaces with the adjunct processor in one of many ways including, but not limited to, Dual Tone Multifrequency (DTMF) signals via a telephone, a computer interface, a customer service representative, or the like.

When a call from telephony device 22 is routed to communication station 14, an attempt is made to route the call to subscriber 20. Communication station 14 then queries adjunct processor 12 for call processing functions. Adjunct processor 12 receives from communication station 14 the inquiry and call identification information of the subscriber 20 and the incoming caller 22. Adjunct processor 12 then accesses a database for call processing instructions in accordance with the subscriber service.

Adjunct processor 12 then compares the ID number of the calling party, as obtained from ANI or by prompting the calling party 22 to enter their ID number, with the ID numbers stored in the subscriber's profile in the database associated with the adjunct processor 12. If the ID number of the calling party 22 indicates that the calling party is authorized to receive a personal communique, the adjunct processor 12 instructs IP 18 to generate appropriate prompts if a PIN is required from the calling party.

After determining that calling party 22 is authorized to receive any of the personal communiques posted by the subscriber, the adjunct processor 12 instructs IP 18 to present the appropriate communique. If the subscriber requires acknowledgement of receipt of the communique, adjunct processor 12 instructs IP 18 to prompt the subscriber to acknowledge receipt of the communique.

Adjunct processor 12 repeats the above process if the calling party 22 is authorized to receive additional communiques. After presenting the appropriate communiques, adjunct processor 12 determines how to handle the calling party based on the subscriber's profile, i.e., transfer calling party to voice mail, call forward the call, ring the subscriber's telephony device 20, or other appropriate treatment.

The present invention allows the subscriber to create multiple communiques for receipt by one or more authorized calling parties. Group leaders may reach multiple individuals with important messages by leaving only one message. In addition, phone tag can be minimized.

While the best modes for carrying out the invention have been described in detail, those familiar with the art to which this invention relates will recognize various alternative designs and embodiments, such as a communication station (switch-based) or a CPE implementation, for practicing the invention as defined by the following claims.

What is claimed is:

1. A method for generating a plurality of predetermined messages associated with a subscriber, each of the plurality of predetermined messages for receipt by at least one authorized calling party, the method comprising:

generating a plurality of lists of calling parties authorized to receive one of the plurality of predetermined messages, wherein each list of calling parties is associated with a respective one of the plurality of predetermined messages;

determining whether a calling party is attempting to connect with the subscriber;

if so, determining an identity of the calling party, wherein determining the identity of a calling party includes determining a telephone number of the calling party;

determining if the calling party is authorized to receive one of the plurality of messages by comparing the identity of the calling party with the plurality of lists of calling parties;

generating the one of the plurality of predetermined messages for receipt by the calling party based on the identity of the calling party and the list of calling parties associated with the one of the plurality of predetermined messages;

generating information for receipt by the subscriber indicating the number of authorized calling parties that have received the one of the plurality of predetermined messages, wherein generating information further includes determining the identity of each of the authorized calling parties that have received the one of the plurality of predetermined messages; and determining an automatic expiration of the one of the plurality of predetermined messages.

2. The method as recited in claim 1 wherein determining the telephone number includes:

prompting the calling party for a calling party identification number; and receiving a response signal from the calling party.

3. The method as recited in claim 1 wherein determining the identity of the calling party further includes prompting the calling party to input a personal identification number (PIN) signal associated with the calling party.

4. The method as recited in claim 1 wherein generating the one of the plurality of predetermined messages further includes prompting the calling party to generate an acknowledgment signal indicating receipt of the one of the plurality of predetermined messages.

5. A system for generating a plurality of predetermined messages associated with a subscriber, each of the plurality of predetermined messages for receipt by at least one authorized calling party, the system comprising:

a communication station for determining whether a calling party is attempting to connect with the subscriber and for determining an identity of the calling party and generating a corresponding identity signal, wherein the communication station, in determining the identity, is further operative to determine a telephone number of the calling party;

an adjunct processor coupled to the communication station for generating a plurality of lists of calling parties authorized to receive one of the plurality of predetermined messages, wherein each list of calling parties is associated with a respective one of the plurality of predetermined messages, the adjunct processor further operative for receiving the identity signal and then determining if the calling party is authorized to receive one of the plurality of messages by comparing the identity of the calling party with the plurality of lists of calling parties, wherein the adjunct processor generates a corresponding processing signal if the calling party is authorized to receive the one of the plurality of predetermined messages, wherein the adjunct processor is further operative to accept automatic expiration information from the subscriber indicating when any one of the plurality of predetermined messages should automatically expire; and an intelligent peripheral unit coupled to the adjunct processor for generating the one of the plurality of predetermined messages for receipt by the calling party based on the processing signal generated by the adjunct processor and for generating information for receipt by the subscriber indicating the number of authorized calling parties that have received the one of the plurality of predetermined messages, wherein the intelligent peripheral unit, in generating information, is further operative to determine the identity of each of the authorized calling parties that have received the one of the plurality of predetermined messages.

6. The system as recited in claim 5 wherein the adjunct processor is further operative to generate a prompt signal and wherein the intelligent peripheral unit is operative to prompt the calling party for a calling party identification number and receive a corresponding response signal from the calling party in response to the prompt signal.

7. The system as recited in claim 5 wherein the adjunct processor is further operative to generate a second prompt signal and wherein the intelligent peripheral unit is operative to prompt the calling party for a personal identification number (PIN) and receive a corresponding PIN signal from the calling party in response to the second prompt signal.

8. The system as recited in claim 5 wherein the intelligent peripheral unit, in generating the one of the plurality of predetermined messages, is further operative to prompt the calling party to generate an acknowledgment signal indicating receipt of the one of the plurality of predetermined messages.

* * * * *